United States Patent
Wayne, Jr.

(10) Patent No.: US 6,435,133 B1
(45) Date of Patent: Aug. 20, 2002

(54) PET BED

(76) Inventor: John F. Wayne, Jr., 13531 SE. 250th St., Kent, WA (US) 98042

(*) Notice: Subject to any disclaimer, the term of this patent is extended or adjusted under 35 U.S.C. 154(b) by 0 days.

(21) Appl. No.: 10/037,736

(22) Filed: Nov. 9, 2001

(51) Int. Cl.$^7$ .............................................. A01K 29/00
(52) U.S. Cl. .................................................... 119/28.5
(58) Field of Search ................................ 199/285, 753, 199/408, 479; 135/102, 104, 116; 5/121, 122, 127, 128, 606, 695, 604

(56) References Cited

U.S. PATENT DOCUMENTS

| | | | |
|---|---|---|---|
| 664,976 A | 1/1901 | Sheffy et al. | |
| 1,820,284 A | * 8/1931 | Mills | |
| 2,172,123 A | 9/1939 | Ebert | 248/164 |
| D127,808 S | 6/1941 | McGillicuddy | |
| 2,836,833 A | 6/1958 | Carlson | 4/185 |
| 2,900,956 A | 8/1959 | Hoffman | 119/15 |
| 3,125,663 A | * 3/1964 | Hoffman | |
| 3,848,279 A | * 11/1974 | Ipsen, Jr. | 5/113 |
| 4,010,880 A | 3/1977 | Guillot-Munoz | 224/42.42 A |
| 4,664,266 A | 5/1987 | Fausett et al. | 211/87 |
| 4,673,211 A | 6/1987 | Hoffman | 297/16 |
| 4,685,725 A | 8/1987 | Helfrich | 297/45 |
| 4,708,308 A | 11/1987 | Snider | 248/165 |
| 4,921,369 A | * 5/1990 | Chew, II et al. | 135/116 |
| 4,967,432 A | * 11/1990 | Kujawski et al. | 5/122 |
| 4,996,944 A | 3/1991 | Zook et al. | 119/20 |
| 5,072,694 A | 12/1991 | Haynes et al. | 119/19 |
| 5,136,981 A | 8/1992 | Barreto, III et al. | 119/28.5 |
| D338,284 S | 8/1993 | Barreto, III et al. | D30/118 |
| 5,320,404 A | 6/1994 | Le Gal | 297/16.2 |
| 5,351,648 A | 10/1994 | Elesh | 119/28.5 |
| 5,362,130 A | 11/1994 | Hoffman | 297/440.11 |
| 5,577,465 A | 11/1996 | Cook | 119/498 |
| D376,875 S | 12/1996 | Glickstein | D30/118 |
| 6,209,486 B1 | * 4/2001 | Reynolds | 119/28.5 |

* cited by examiner

Primary Examiner—Thomas Price
(74) Attorney, Agent, or Firm—Joan H. Pauly

(57) ABSTRACT

A pet bed has a generally triangular configuration with truncated angles. Each of the three sides of a flexible support platform is attached to a corresponding rail. The rails have first interengaging portions that engage second interengaging portions of three generally U-shaped leg members. The support platform is dimensioned to space adjacent ends of adjacent rails apart a first distance. Opposite arms of each leg member have an unstressed position in which the outer free ends of the arms are spaced apart a distance greater than this first distance. The arms are sufficiently flexible to bend to move their outer ends toward each other when squeezed together by a user. The outer ends are squeezed together and engaged with the first interengaging portions to assemble the bed. In the assembled bed, the platform is in tension and the outer ends of the arms are urged outwardly against the first interengaging portions to provide a stable assembled condition.

18 Claims, 5 Drawing Sheets

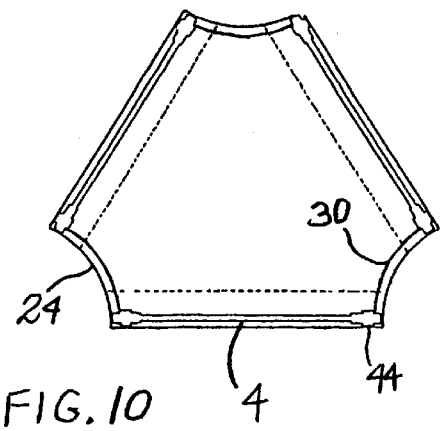
FIG. 10
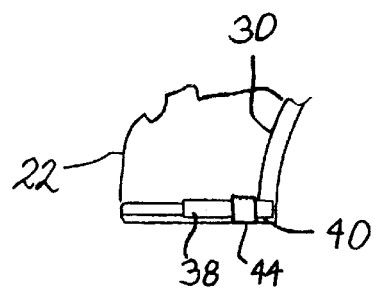
FIG. 11
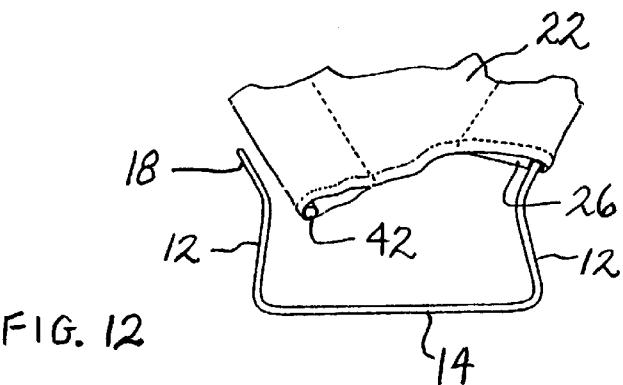
FIG. 12
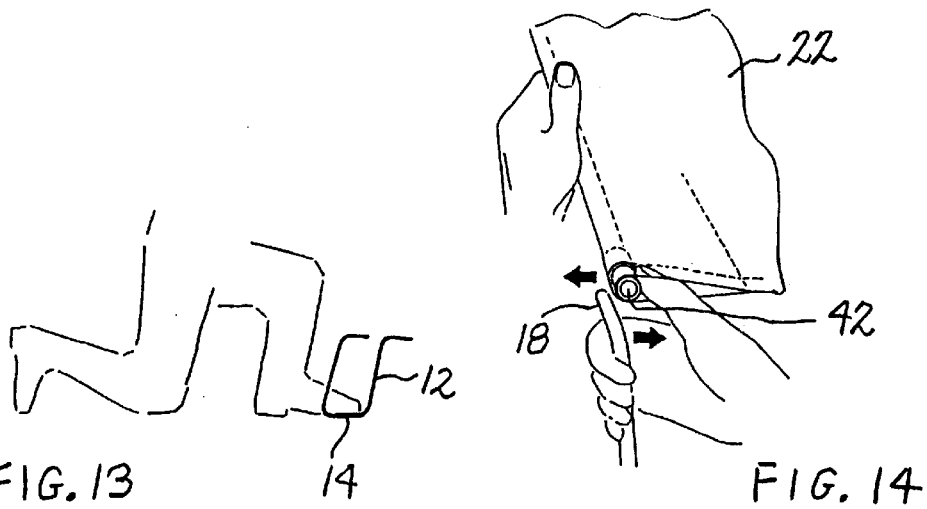
FIG. 13
FIG. 14
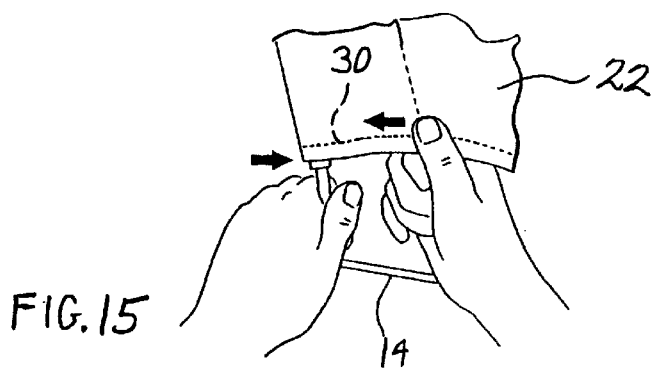
FIG. 15

PET BED

TECHNICAL FIELD

This invention relates to pet beds and, more particularly, to a pet bed that is readily assembled and disassembled and is held in a stable assembled condition by tension in a flexible support platform opposing an elastic tendency of arms of leg members to move apart.

BACKGROUND INFORMATION

There is a wide variety of pet beds on the market and/or disclosed in issued patents. These pet beds can be grouped into two broad categories: the on-the-floor category and the off-the-floor category. The pillow or stuffed bag type of pet bed is representative of the first group. They can provide a comfortable rest area for a pet but are difficult to keep clean, transport or use in a kennel. The raised platform approach generally provides an off-the-floor bed that can be disassembled for cleaning or transporting and is easier to keep clean because ground/floor contact is limited to the feet of the pet bed. However, raised platform pet beds are generally difficult to assemble and disassemble. This is critical for keeping the bed clean.

Accordingly there is a need for a pet bed that provides a comfortable clean rest area for the pet indoors or out, and minimizes the effort required to maintain or transport the bed.

BRIEF SUMMARY OF THE INVENTION

The present invention provides an improved design for pet beds. According to an aspect of the invention, the pet bed comprises at least three rails, at least three leg members, and a flexible support platform. Each rail has opposite ends, which include first interengaging portions. In an assembled condition of the pet bed, each rail forms a center portion of a different side of a polygon and has each of its ends adjacent to an end of another of the rails. Each leg member includes a pair of arms and a bight. Each arm has a first end and a second end including second interengaging portions. The bight interconnects the first ends of the arms and is configured to rest on a support surface with the arms extending upwardly therefrom to support the pet bed. The second interengaging portions of the arms are configured to engage the first interengaging portions of the rails. The support platform has a side portion corresponding to each of the rails. Each side portion is attached to its corresponding rail. The platform is dimensioned to space adjacent ends of adjacent rails apart a first distance. The arms of each of the leg members are sufficiently flexible to bend to move the second ends of the arms toward each other when squeezed together by a user. The arms have an unstressed position in which the second ends are spaced apart a distance greater than said first distance. The arms are also sufficiently elastic to return to their unstressed position when a force tending to move or hold the second ends together is removed. As used herein, the term "upwardly" and the like refer to the use orientation of the pet bed shown in FIGS. 1 and 2.

The pet bed preferably comprises three rails and three leg members and has a generally triangular configuration. However, the bed may also have more than three rails and more than three leg members and a polygonal configuration other than a triangular configuration. Whether the configuration is triangular or not, it preferably has truncated angles.

The interengaging portions may take various forms. Preferably, for each end of each rail, the first and second interengaging portions include a fitting carried by one of the rail and the arm. The fitting has a tubular end with an axial opening therein. An end portion of the other of the rail and the arm is configured to be received into the axial opening. In an embodiment of the invention, the fitting is made from plastic and is carried by the rail.

The desired flexibility and elasticity of the arms may be provided in various ways. In the currently preferred embodiment, the arms are at least partially made from spring steel.

According to another aspect of the invention, the pet bed comprises at least three rails, at least three leg members, and a flexible support platform. The rails and leg members have first and second interengaging portions, respectively. Each leg member includes a pair of arms and a bight, with the bight interconnecting first ends of the arms. The platform is dimensioned as described above. The pet bed also includes means for urging the second ends of the arms of each leg member away from each other when the second ends are held said first distance apart by the platform in the assembled condition of the pet bed.

The pet bed of the invention has a number of significant advantages. It has a highly stable assembled configuration but can be assembled and disassembled quickly and easily. The preferred embodiment of the pet bed can be assembled and disassembled without the use of any tools. The bed is suitable for use in a wide variety of environments, including indoor environments and outdoor environments. Its easy assembly and disassembly facilitates disassembly into a compact configuration for travel. It also allows quick and easy cleaning of the bed, for example machine washing of the support platform. In addition to its ease of use and maintenance, the pet bed provides a comfortable resting place for a pet that is raised above the support surface, whether such surface be a floor, an outdoor ground surface, or some other type of surface.

These and other advantages and features of the invention will become apparent from the detailed description of the invention that follows.

BRIEF DESCRIPTION OF THE DRAWINGS

In the drawings, like element designations refer to like parts throughout, and:

FIGS. 10–15 illustrate the assembly of the pet bed shown in FIGS. 1–7.

FIG. 10 is a bottom plan view of the flexible support platform and the rails and fittings associated therewith, with the folded side edge portions of the platform omitted to reveal the rails and fittings.

FIG. 11 is a fragmentary enlarged plan view of a portion of FIG. 10.

FIG. 12 is a pictorial view of one of the truncated corners of the platform with a leg member partially attached thereto.

FIG. 13 illustrates the foot of a user holding a leg member in position by placing his foot on the bight thereof.

FIG. 14 is a pictorial view illustrating the user moving the second arm of the leg member into position to be inserted into the fitting shown in FIGS. 10 and 11.

FIG. 15 is a pictorial view showing the user making final adjustments in the assembly of the pet bed.

DETAILED DESCRIPTION OF THE INVENTION

Figure 1:
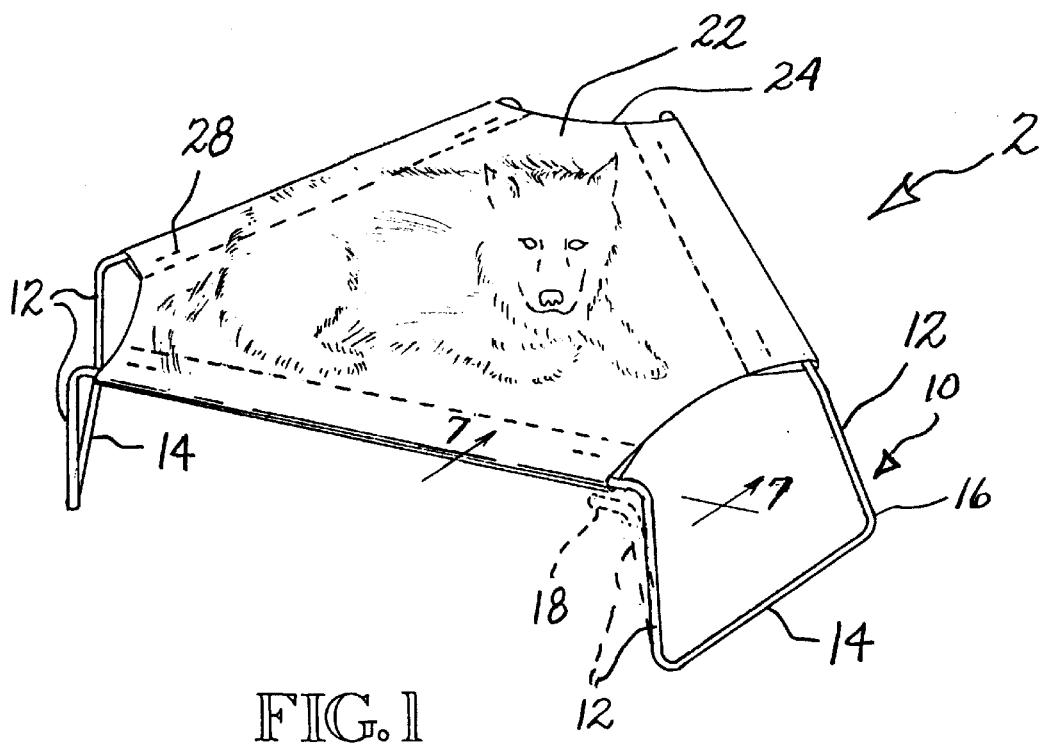
FIG. 1 is a pictorial view of the preferred embodiment of the pet bed in its assembled condition showing in phantom a dog resting on the pet bed and showing in phantom lines the unstressed position of one of the arms of a leg member.
Figure 2:
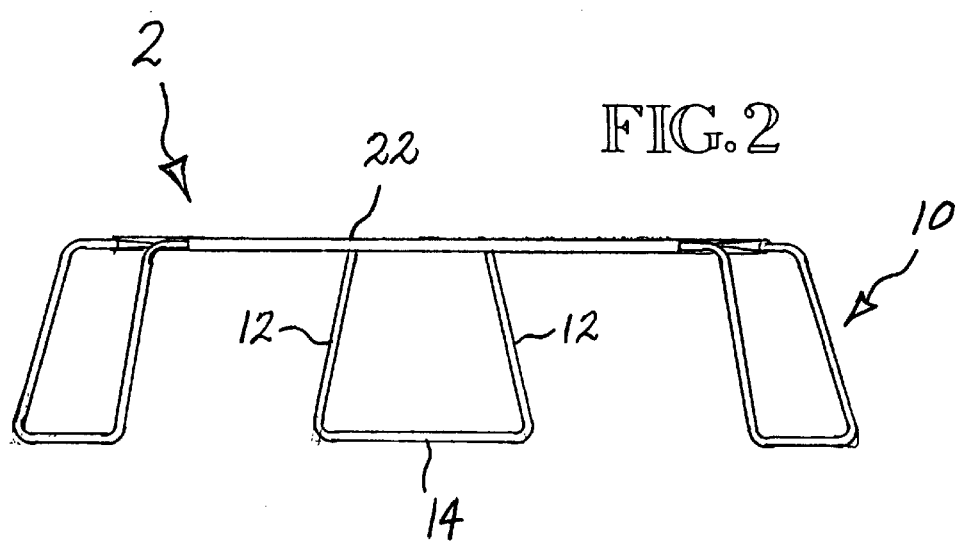
FIG. 2 is an elevational view of the pet bed shown in FIG. 1 looking toward one of the sides of the bed.
Figure 3:
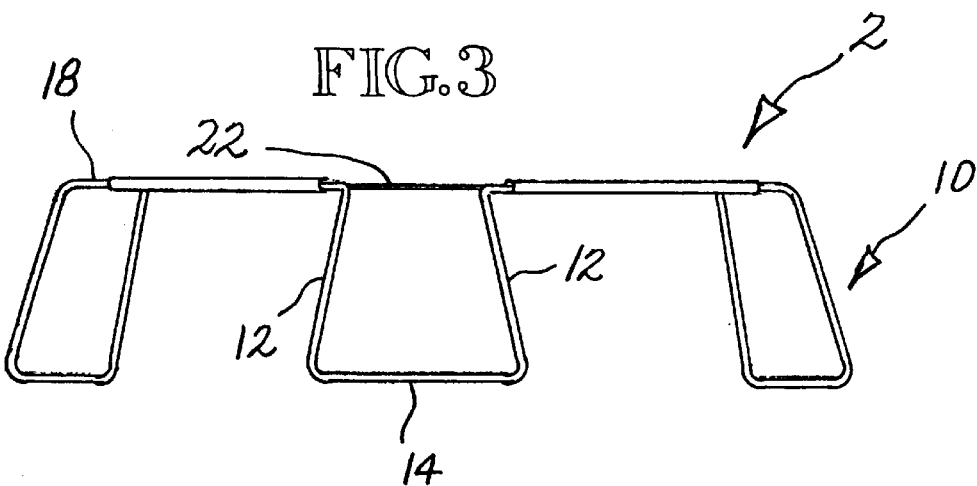
FIG. 3 is like FIG. 2 but looking toward one of the truncated angles.
Figure 4:
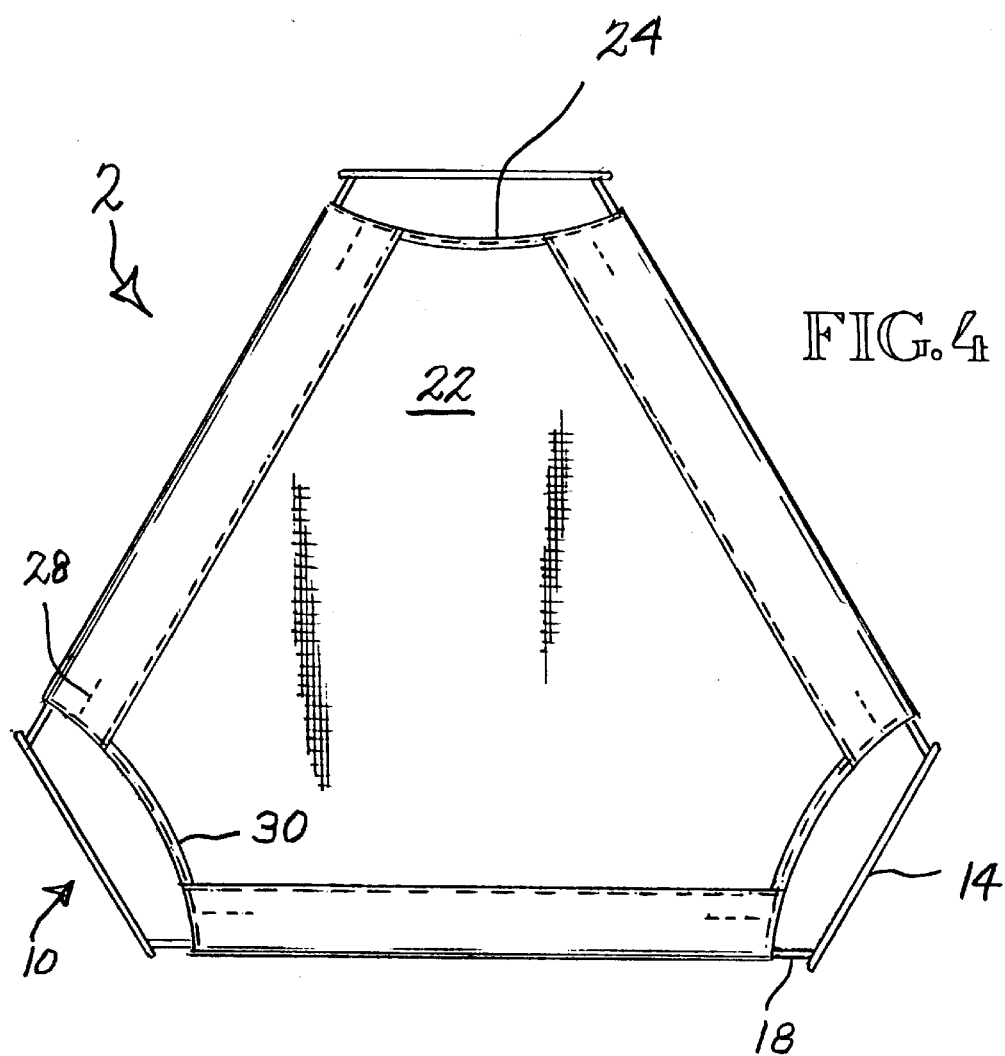
FIG. 4 is a bottom plan view of the pet bed shown in FIGS. 1–3.
Figure 5:
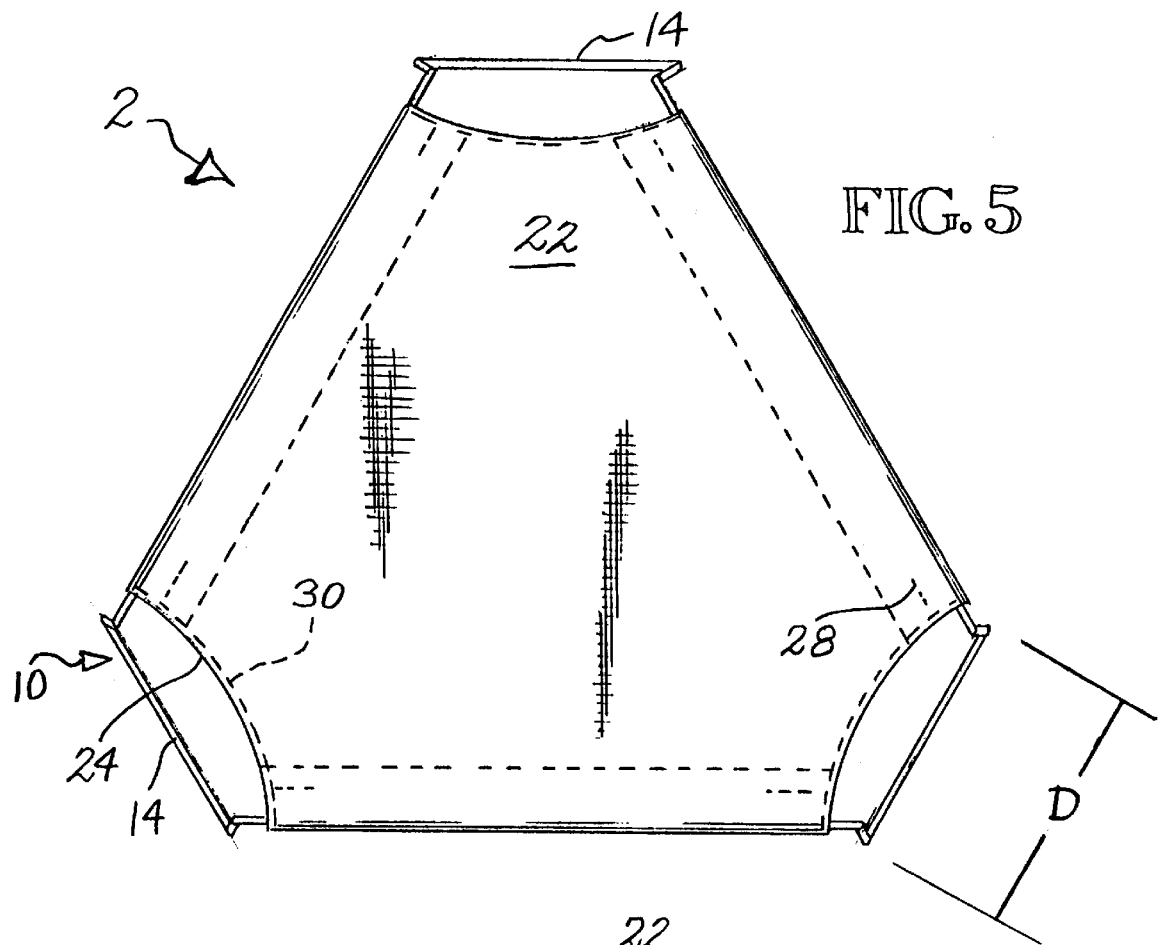
FIG. 5 is a top plan view of the pet bed shown in FIGS. 1–4.

The drawings illustrate a pet bed 2 and two embodiments of the rails and fittings thereof that are constructed in accordance with the invention and that constitute the best modes for carrying out the invention currently known to the applicant. FIG. 1 illustrates the pet bed in use as a resting place for a dog. The pet bed of the invention may also be used by other types of animals, such as cats.

The preferred embodiment of the pet bed 2 shown in the drawings has a generally triangular configuration with the angles 24 of the configuration being truncated, as best seen in FIGS. 1, 4, 5 and 10. This configuration is the preferred configuration, but, as noted above, the pet bed of the invention could also have more than three sides and a different polygonal configuration. The pet bed 2 includes a flexible support platform 22 on which a pet can sit or lie, as illustrated in FIG. 1. The platform 22 is supported in a raised position above an indoor or outdoor support surface by a plurality of leg members 10. In the preferred embodiment, there are three leg members 10.

Figure 7:
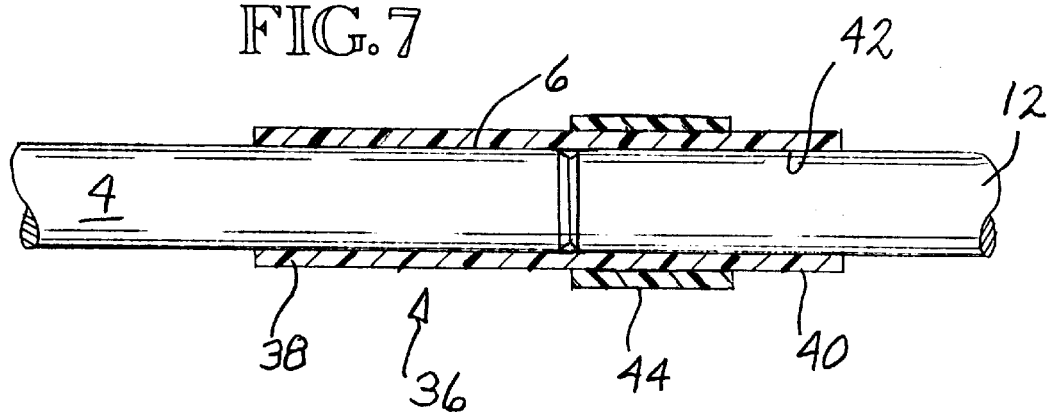
FIG. 7 is a sectional view taken substantially along the line 7—7 in FIG. 1, with parts shown in elevation.

Referring to FIGS. 7 and 10, the pet bed 2 includes a plurality of rails. In the preferred embodiment shown in the drawings, there are three rails 4, one corresponding to each of the three sides of the support platform 22. In pet beds having configurations other than a generally triangular configuration, there would be a corresponding greater number of rails. Referring to the drawings, each rail 4 has opposite ends 6. The ends 6 include first interengaging portions that engage the leg members 10 in the assembled pet bed 2. In the preferred embodiments shown in the drawings, the first interengaging portions are formed by fittings 36, 46 secured to the ends 6 of the rails 4 and in effect forming extensions of the ends 6. In the assembled condition of the pet bed 2, each rail 4 forms a center portion of a different side of a polygon (a triangle in the illustrated embodiment) and has each of its ends 6 adjacent to an end 6 of another of the rails 4. The adjacent position is best seen in FIG. 10. The rails 4 are preferably steel rods and are powder coated with baked on plastic to improve appearance and inhibit rust.

Each of the three leg members 10 of the pet bed 2 is generally U-shaped and includes a pair of arms 12 and a bight 14. Each arm 12 has a first end 16 and a second end 18. The second end 18 includes second interengaging portions that engage the fittings 36, 46 in the assembled pet bed 2. The bight 14 interconnects the first ends 16 of the arms 12 and is configured to rest on a support surface, such as a floor or an outdoor ground surface, with the arms 12 extending upwardly therefrom to support the pet bed, as illustrated in FIG. 1. The bight 14 has a length, extending between the first ends 16 of the arms 12, long enough to provide stability when the bed 2 is resting on a support surface.

The flexible support platform 22 is preferably made from a fabric, such as a canvas-like fabric or a more plush fabric. In the currently preferred embodiment, the platform 22 is made from a polyester fabric. This type of fabric is strong and durable and has stable dimensions. A polyester platform 22 has a minimal tendency to sag and is readily washable to maintain the cleanliness of the pet bed 2.

As noted above, the pet bed 2 has a triangular configuration with truncated angles 24. These truncated angles 24 are formed by the truncated angles 24 of the platform 22. Each of the sides of the platform 22 is attached to its corresponding rail 4. The platform 22 is dimensioned to space adjacent ends 6 of adjacent rails 4 apart a first distance D, illustrated in FIG. 5. The attachment to the rails 4 may be accomplished in various ways. Preferably, it is accomplished simply by forming a channel 26 along each side of the platform 22 by folding the fabric of the platform 22 around to the underside of the platform 22 and stitching the folded portion in position. This allows a rail 4 to be attached simply by sliding the rail 4 into the channel 26. A short run of stitching 28 may be provided near each end of each of the channels 26 to narrow the channel 26 at its ends to assist in preventing unwanted sliding of the rails 4 out of their assembled positions inside the channels 26. Each channel 26 is preferably continuous as shown in the drawings, but could also be discontinuous and formed, for example, by a plurality of side flaps.

The edge of the platform 22 at each of the truncated angles 24 is provided with a strip of nylon webbing 30. The webbing 30 is illustrated in FIGS. 4–6, 10–12, 14 and 15. The webbing 30 prevents the material of the platform 22 from stretching and also provides a means for preventing the sides of the platform 22 from sliding inwardly out of position, as described further below.

An important feature of the invention is the manner in which the platform 22 cooperates with the leg members 10 to provide a stable assembled configuration of the pet bed 2. The arms 12 of each of the leg members 10 are sufficiently flexible to bend to move the second ends 18 of the arms 12 toward each other when squeezed together by a user. In the unstressed position of the arms 12 with no external force urging the arms 12 together, the second ends 18 are spaced apart a distance greater than the distance D between the second ends 18 in the assembled pet bed 2. The arms 12 are sufficiently elastic to return to their unstressed position when a force tending to move or hold the second ends 18 together is removed.

In the preferred embodiment, the desired flexibility and elasticity is provided by forming the leg members 10 from spring steel. Thus, in the preferred embodiment, the arms 12 and their spring characteristics form means for urging the second ends 18 of the arms 12 away from each other when the second ends 18 are held the distance D apart by the platform 22 in the assembled pet bed 2. The urging of the second ends 18 apart could also be provided by different structure. For example, one or more compression springs could be provided extending between the two arms 12 of a leg member 10 or between the bight 14 and an arm 12. Referring to the preferred embodiment, the spring force of the arms 12 urging the second ends 18 apart puts the platform 22 in tension and stabilizes the interengagement of the rails 4 and arms 12. The outward force of the arms 12 on the fittings 36, 46 creates a strong resistance to disengagement of the arms 12 from the fittings 36, 46. In other words, the tensioned platform 22 tends to hold the second ends 18 together so that they are the distance D apart, and this holding of the ends 18 together causes the arm ends 18 to resist disengagement. The resistance to disengagement is effective whether or not the bed 2 is in use and is increased when there is a load on the bed 2, such as a pet lying on the platform 22. The tensioning of the platform 22 also provides good support for the pet and keeps the bed 2 looking neat and trim when not in use. The The fitting 36 that provides the first interengaging portions of the rails 4 of the embodiment shown in FIGS. 1–7 is best seen in FIG. 7. The fitting 36 includes a relatively long tubular end 38 and a shorter tubular end 40. The end 40 defines an axial opening 42. A cylindrical sleeve 44 forms a flange or stop on the outer cylindrical surface of the fitting 36 around a portion of the shorter tubular end 40 adjacent to the longer tubular end 38. The fitting 36 is preferably made from a strong durable material, such as nylon. The end 6 of the rail 4 is received into the longer tubular end 38. The fitting 36 may be provided with an internal shoulder (not shown) so that, during manufacture, the rail end 6 does not slide into the axial opening through the fitting 36 more than the desired distance. The fitting 36 is permanently attached to the rail end 6 during manufacture. Preferably, the fitting is heated, the rail end 6 is inserted, and then the fitting 36 is cooled to shrink it securely onto the rail end 6. Currently, the type of nylon used to make zippers is preferred for forming the fitting 36. This type of nylon is strong, wears well, and shrinks a significant amount when heated and then cooled. This type of nylon also is self-lubricating, i.e. has inherent slipperiness, so that the second end 18 of an arm 12 of a leg member 10 slips easily into the axial opening 42 in the short tubular end 40 when the pet bed 2 is being assembled. FIG. 7 illustrates the fitting 36 and end portions of the rail 4 and arm 12 in an assembled condition.

Figure 8:
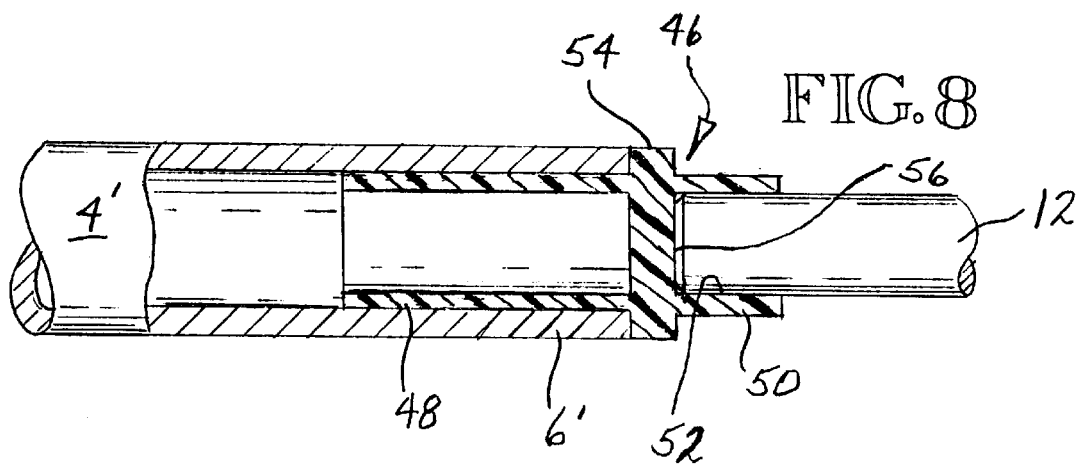
FIG. 8 is similar to FIG. 7 except that it shows an alternative embodiment of the rail and the fitting at the end thereof.

FIG. 8 illustrates an alternative type of fitting that is used with tubular rails 4', particularly in larger sizes of the pet bed 2 intended for larger animals. The fitting 46 shown in FIG. 8 includes a tubular cylindrical rail end 48 and a shorter tubular cylindrical arm end 50. The arm end 50 defines an axial opening 52. An annular flange or stop 54 is formed on a mid portion of the outer surface of the fitting 46. As shown in FIG. 8, the flange 54 is formed between the rail end 48 and the arm end 50. The fitting 46 also includes an inner stop 56 to limit movement of the second end 18 of the arm 12 into the axial opening 52. As shown, the flange 54 and inner stop 56 together have a disk-like configuration and the fitting 46 is a single integrally formed member. These characteristics may be varied. For example, the axial location of the inner stop 56 may be offset from the axial location of the flange 54. In addition, the flange 54 and/or the stop 56 may be formed separately and then secured to the main body of the fitting 46. The fitting 46 is preferably made from molded plastic, such as nylon. The preferred structure of the fitting 46 shown in FIG. 8 has a rail end 38 that is tubular or hollow because a hollow end allows better control of the shape of the end 38 during manufacture of the fitting 46.

Figure 9:
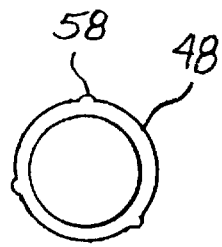
FIG. 9 is an end view of the rail end of the fitting shown in FIG. 8.

Referring to FIG. 9, the longer rail end 48 of the fitting 46 has a plurality of, preferably three, longitudinal axially extending ribs 58 formed thereon. When the pet bed is being manufactured, the rail end 48 is press fit into the axial opening in the tubular end 6' of the rail 4', and the ribs 58 are compressed. The compressed ribs 58 resist disengagement of the fitting end 48 from the rail 4' so that, in practical effect, the fitting 46 is permanently attached to the end 6' of the rail 4'. As can be seen in FIG. 8, when the fitting end 48 is pressed into the rail end 6', the radial end surface of the rail 4' moves into a position in which it abuts a radial surface of the flange 54. This abutment limits movement of the fitting 46 into the rail 4' to a desired distance. As in the embodiment shown in FIG. 7, during assembly of the pet bed 2, the second end 18 of the leg member arm 12 is moved into the axial opening 52 defined by the arm end 50 of the fitting 46.

The assembly of the pet bed is illustrated in FIGS. 10–15. Referring to FIG. 10, the fabric platform 22 is placed upside down to lie flat on the floor. The rails 4 are slid into their corresponding channels 26 in the sides of the platform 22. The rails 4 are slid into the position shown in FIGS. 10 and 11. In this position, at each end 6 of each rail 4, the nylon webbing 30 on the edge of the platform 22 abuts the outwardly facing radial shoulder on the flange 44 on the fitting 36. The abutting position prevents the side of the platform 22 from sliding inwardly toward the center of the rail 4 to maintain the platform sides in their correct position.

With the rails 4 in position, the leg members 10 can be attached. Referring to FIG. 12, the second end 18 of one of the arms 12 of the leg member at each of the truncated corners 24 is inserted into the axial opening 42 in the fitting 36 by simply sliding the end 18 into the opening 42. After this has been done, the second end 18 of the other arm 12 is spaced outwardly from its corresponding fitting 36 because the unstressed distance between the two second ends 18 is greater than the distance D.

Figure 6:
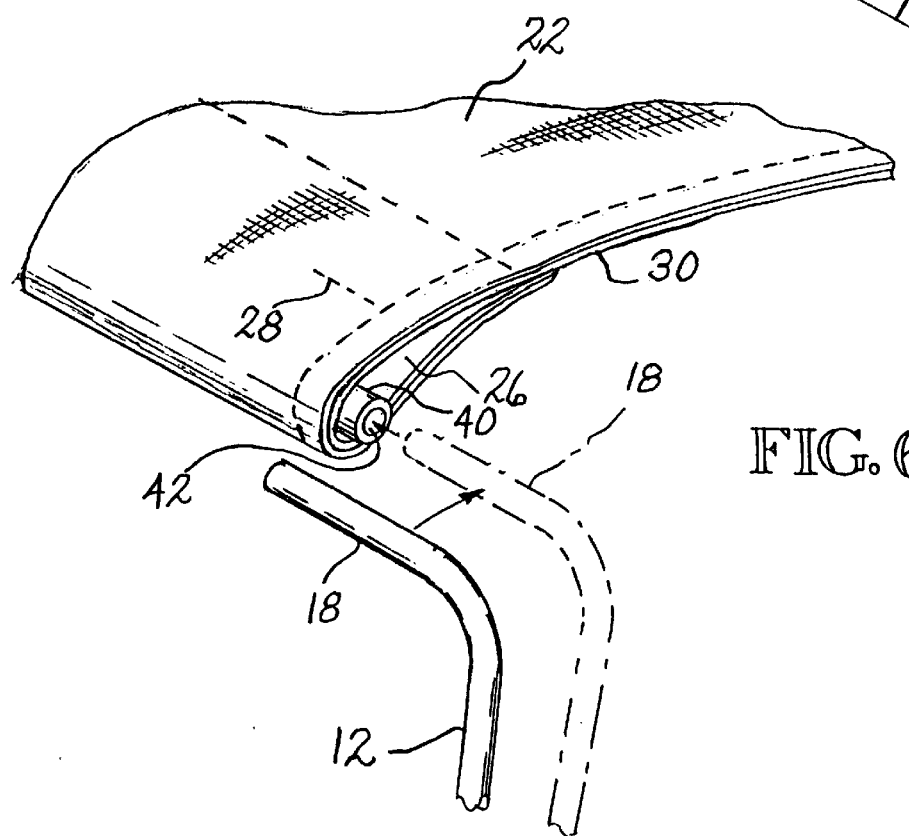
FIG. 6 is a fragmentary pictorial view illustrating one set of first and second interengaging portions.

FIGS. 13 and 14 illustrate the attachment of the end 18 of the second arm 12 to its fitting 36. FIG. 13 shows the user placing a foot on the bight 14 of the leg member 10 to hold the leg member 10 in position while the end 18 is being inserted. FIGS. 6 and 14 illustrate the insertion of the end 18. The user presses outwardly on the end of the fitting 36 with the thumb and simultaneously pulls inwardly on the arm 12 with the fingers of the same hand. When the arm 12 has been pulled inwardly sufficiently to align the end 18 with the axial opening 42, the end 18 is simply slid into the opening 42. As this is being done, the user grasps the side of the platform 22 with the other hand. This procedure is followed for each of the three corners 24 of the pet bed 2.

FIG. 15 illustrates final adjustment of the pet bed 2 to complete the assembly. This final adjustment includes checking each side of each corner to see if the nylon webbing 30 is still in proper position abutting the outwardly facing radial shoulder of the fitting flange 44. If any webbing 30 is out of position, it is repositioned using both hands, as illustrated by the arrows in FIG. 15. When this has been done, the assembly is completed and the pet bed is ready for use. The disassembly of the pet bed is accomplished by following the procedure illustrated in FIG. 14 but sliding the ends 18 out of the openings 42 rather than inserting the ends 18.

Although the preferred embodiments of the invention have been illustrated and described herein, it is intended to be understood by those skilled in the art that various modifications and omissions in form and detail may be made without departing from the spirit and scope of the invention as defined by the following claims.

What is claimed is:

1. A pet bed comprising:
    at least three rails; each said rail having opposite ends; said ends including first interengaging portions; and, in an assembled condition of the pet bed, each said rail forming a center portion of a different side of a polygon and having each of its ends adjacent to an end of another of said rails;

at least three leg members, each said member including a pair of arms and a bight, each said arm having a first end and a second end including second interengaging portions, said bight interconnecting said first ends and being configured to rest on a support surface with said arms extending upwardly therefrom to support the pet bed, and said second interengaging portions being configured to engage said first interengaging portions; and a flexible support platform having a side portion corresponding to each said rail, each said side portion being attached to its corresponding rail, and said platform being dimensioned to space adjacent ends of adjacent rails apart a first distance;

said arms of each of said leg members being sufficiently flexible to bend to move said second ends toward each other when squeezed together by a user, having an unstressed position in which said second ends are spaced apart a distance greater than said first distance, and being sufficiently elastic to return to said unstressed position when a force tending to move or hold said second ends together is removed.

2. The pet bed of claim 1, which comprises three said rails and three said leg members, and which has a generally triangular configuration.

3. The pet bed of claim 2, wherein said triangular configuration has truncated angles.

4. The pet bed of claim 2, wherein, for each end of each said rail, said first and second interengaging portions include a fitting carried by one of said rail and said arm, said fitting having a tubular end with an axial opening therein, and an end portion of the other of said rail and said arm configured to be received into said axial opening.

5. The pet bed of claim 4, wherein said fitting is made from plastic and is carried by said rail.

6. The pet bed of claim 2, wherein said arms are at least partially made from spring steel.

7. The pet bed of claim 1, wherein said arms are at least partially made from spring steel.

8. The pet bed of claim 1, wherein said polygon has truncated angles.

9. The pet bed of claim 1, wherein, for each end of each said rail, said first and second interengaging portions include a fitting carried by one of said rail and said arm, said fitting having a tubular end with an axial opening therein, and an end portion of the other of said rail and said arm configured to be received into said axial opening.

10. The pet bed of claim 9, wherein said fitting is made from plastic and is carried by said rail.

11. A pet bed comprising:

at least three rails; each said rail having opposite ends; said ends including first interengaging portions; and, in an assembled condition of the pet bed, each said rail forming a center portion of a different side of a polygon and having each of its ends adjacent to an end of another of said rails;

at least three leg members, each said member including a pair of arms and a bight, each said arm having a first end and a second end including second interengaging portions, said bight interconnecting said first ends and being configured to rest on a support surface with said arms extending upwardly therefrom to support the pet bed, and said second interengaging portions being configured to engage said first interengaging portions;

a flexible support platform having a side portion corresponding to each said rail, each said side portion being attached to its corresponding rail, and said platform being dimensioned to space adjacent ends of adjacent rails apart a first distance; and means for urging said second ends of said arms of each said leg member away from each other when said second ends are held said first distance apart by said platform in said assembled condition of the pet bed.

12. The pet bed of claim 11, which comprises three said go, rails and three said leg members, and which has a generally triangular configuration.

13. The pet bed of claim 12, wherein said triangular configuration has truncated angles.

14. The pet bed of claim 12, wherein, for each end of each said rail, said first and second interengaging portions include a fitting carried by one of said rail and said arm, said fitting having a tubular end with an axial opening therein, and an end portion of the other of said rail and said arm configured to be received into said axial opening.

15. The pet bed of claim 14, wherein said fitting is made from plastic and is carried by said rail.

16. The pet bed of claim 11, wherein said polygon has truncated angles.

17. The pet bed of claim 11, wherein, for each end of each said rail, said first and second interengaging portions include a fitting carried by one of said rail and said arm, said fitting having a tubular end with an axial opening therein, and an end portion of the other of said rail and said arm configured to be received into said axial opening.

18. The pet bed of claim 17, wherein said fitting is made from plastic and is carried by said rail.

* * * * *